(12) United States Patent
Sun

(10) Patent No.: US 7,139,294 B2
(45) Date of Patent: Nov. 21, 2006

(54) MULTI-OUTPUT HARMONIC LASER AND METHODS EMPLOYING SAME

(75) Inventor: Yunlong Sun, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 247 days.

(21) Appl. No.: 10/893,148

(22) Filed: Jul. 16, 2004

(65) Prior Publication Data

US 2005/0254530 A1     Nov. 17, 2005

Related U.S. Application Data

(60) Provisional application No. 60/571,443, filed on May 14, 2004.

(51) Int. Cl.
*H01S 3/11*     (2006.01)
*H01S 3/10*     (2006.01)
*B23K 26/00*    (2006.01)

(52) U.S. Cl. ............ 372/10; 372/22; 219/121.76
(58) Field of Classification Search ............ 372/10, 372/22; 219/121.76
See application file for complete search history.

(56) References Cited

U.S. PATENT DOCUMENTS

| | | | |
|---|---|---|---|
| 3,947,780 A | 3/1976 | Rice et al. ............ 331/94.5 |
| 5,231,641 A | 7/1993 | Ortiz ............ 372/21 |
| 5,272,309 A | 12/1993 | Goruganthu et al. ... 219/121.63 |
| 5,361,268 A | 11/1994 | Fossey et al. ............ 372/23 |
| 5,586,138 A | 12/1996 | Yokoyama ............ 372/97 |
| 5,841,099 A | 11/1998 | Owen et al. ............ 219/121.69 |
| 5,847,960 A | 12/1998 | Cutler et al. ............ 364/474.29 |
| 5,850,407 A | 12/1998 | Grossman et al. ............ 372/22 |
| 5,854,870 A | 12/1998 | Helmfrid et al. ............ 385/122 |
| 5,943,351 A | 8/1999 | Zhou et al. ............ 372/22 |
| 6,097,742 A | 8/2000 | Caprara et al. ............ 372/22 |
| 6,169,014 B1 | 1/2001 | McCulloch ............ 438/487 |
| 6,210,401 B1 | 4/2001 | Lai ............ 606/12 |
| 6,252,195 B1 | 6/2001 | Mosavi et al. ............ 219/121.69 |
| 6,281,471 B1 | 8/2001 | Smart ............ 219/121.62 |
| 6,292,504 B1 | 9/2001 | Halmos ............ 372/97 |
| 6,339,604 B1 | 1/2002 | Smart ............ 372/26 |
| 6,356,575 B1 | 3/2002 | Fukumoto ............ 372/23 |

(Continued)

FOREIGN PATENT DOCUMENTS

JP    0884128 A1    12/1998

(Continued)

OTHER PUBLICATIONS

Aug. 8, 2005 International Search Report and the Written Opinion concerning the corresponding PCT/US2005/010196.

*Primary Examiner*—Minsun Oh Harvey
*Assistant Examiner*—Marcia A. Golub
(74) *Attorney, Agent, or Firm*—Stoel Rives LLP

(57) ABSTRACT

A solid-state laser (10) has a laser resonator (20) with output ports (22) at both ends to provide two separate laser micromachining beams (42). A set of wavelength converters (26) can be employed to convert the laser machining beams (42) to harmonic wavelength outputs, thus reducing the risk of damage to the wavelength converters and enabling higher total average harmonic power to be generated from a single laser. The laser machining beams (42) can be different to perform different laser operations independently or can be adapted to have substantially identical parameters to permit simultaneous parallel high-quality laser operations on substantially identical workpieces (54), or the laser machining beams (42) can be combined to provide a single laser system output (42e). The two laser machining beams (42) can be further split or multiplexed to suit particular applications.

64 Claims, 7 Drawing Sheets

U.S. PATENT DOCUMENTS

| | | | |
|---|---|---|---|
| 6,541,731 B1 | 4/2003 | Mead et al. | 219/121.7 |
| 6,574,250 B1 | 6/2003 | Sun et al. | 372/25 |
| 6,697,394 B1 | 2/2004 | Tuennermaun et al. | 372/26 |
| 6,703,582 B1 | 3/2004 | Smart et al. | 219/121.62 |
| 6,727,458 B1 | 4/2004 | Smart | 219/121.62 |
| 6,878,899 B1 | 4/2005 | Smart | 219/121.61 |
| 2001/0021205 A1 | 9/2001 | Kittelmann et al. | 372/13 |
| 2004/0134894 A1 | 7/2004 | Gu et al. | 219/121.68 |
| 2004/0134896 A1 | 7/2004 | Gu et al. | 219/121.69 |
| 2004/0188399 A1 | 9/2004 | Smart | 219/121.69 |
| 2005/0092720 A1 | 5/2005 | Gu et al. | 219/121.69 |
| 2005/0115936 A1 | 6/2005 | Gu et al. | 219/121.69 |
| 2005/0115937 A1 | 6/2005 | Gu et al. | 219/121.69 |
| 2005/0117620 A1 | 6/2005 | Thro et al. | 372/70 |
| 2005/0150879 A1 | 7/2005 | Gu et al. | 219/121.69 |
| 2005/0150880 A1 | 7/2005 | Gu et al. | 219/121.69 |

FOREIGN PATENT DOCUMENTS

| | | |
|---|---|---|
| JP | 11090659 | 6/1999 |
| WO | WO 98/01790 | 1/1998 |
| WO | WO 98/52260 | 11/1998 |
| WO | WO 01/14096 A1 | 3/2001 |

MULTI-OUTPUT HARMONIC LASER AND METHODS EMPLOYING SAME

RELATED APPLICATIONS

This application claims priority from U.S. Provisional Application No. 60/571,443, filed May 14, 2004.

COPYRIGHT NOTICE

©2004 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention relates to solid-state lasers and, in particular, to laser systems or methods that employ at least two harmonic beams to perform micromachining operations such as via formation.

BACKGROUND OF THE INVENTION

Conventional solid-state lasers provide only a single beam of laser output at a given time, and conventional solid-state harmonic lasers provide only a single harmonic beam of laser output at a given time. An exemplary solid-state harmonic laser produces UV laser pulses of 8–10 W average power in a single beam at a repetition rate of about 1–100 kHz. To increase laser system throughput for a given laser micromachining operation, skilled practitioners have used laser systems with more than one laser head or a variety of beam-splitting techniques. These techniques have several disadvantages.

If two or more lasers are employed to increase system throughput by processing identical targets simultaneously with parallel processing operations, then the extra lasers require additional space for and multiply the cost of the laser system. Even when such lasers employ identical pumping sources, laser media, harmonic converters, and output coupling mirrors in an "identical" design, and additionally employ identical optical-path components and system control electronics, skilled persons will appreciate that it is difficult to match the laser output parameters, such as energy per pulse, beam shape or quality, and/or divergence angle or focused spot size, of each of the different laser beams due to variations in the quality of the components when they are new and due to variations in age-related deterioration of the components.

On the other hand, beam-splitting techniques, such as those employed to increase throughput in applications such as via drilling, require a higher-power laser beam to be generated from the laser so that the generated beam can be divided into the number of desired beams. Unfortunately, the highest practical available harmonic power is primarily limited by the risk of damage to the harmonic converter. Higher power capabilities also tend to decrease the reliability of the laser head, increase the damage risk to various optical components, and decrease the laser system lifetime.

Solid-state harmonic lasers and methods for employing such lasers that overcome these disadvantages are, therefore, desirable.

SUMMARY OF THE INVENTION

An object of the present invention is, therefore, to provide a solid-state laser for providing multiple laser output beams.

Another object of the invention is to provide such a solid-state laser that provides two or more harmonic laser output beams.

A further object of the invention is to provide a method for employing such a solid-state laser to increase the processing throughput of a laser system.

The present invention preferably employs a solid-state laser having a laser resonator with output ports on opposite sides of a laser medium to provide two separate laser machining beams. In one embodiment, the output ports are resonator mirrors that are partly transmissive to the fundamental wavelength generated by one or more laser media so that the laser resonator provides two separate laser machining beams at the fundamental wavelength. In an alternative embodiment, extracavity wavelength converters are employed to convert one or both fundamental wavelength beams to a harmonic wavelength. In another alternative embodiment, intracavity wavelength converters are positioned on one or both sides of the laser medium. The laser cavity may also include an optional Q-switch and/or aperture. The output ports employed in connection with intracavity wavelength converters can be resonator mirrors that are preferably highly reflective to the fundamental wavelength generated by one or more laser media and highly transmissive to the wavelength of the desired harmonic laser output. Alternatively, the output ports may employ other wavelength sensitive optics, such as a prism or an angle-cut nonlinear crystal to deflect harmonic laser output from the resonator. Each set of wavelength converters may comprise one, two, or three nonlinear crystals suited for specific harmonic generation. Further embodiments include a wave plate within one or both sets of nonlinear crystals for adjusting the power of each harmonic beam.

In an alternative embodiment, the laser contains at least one fold mirror to facilitate end-pumping the laser medium. In another preferred embodiment, an additional solid-state laser medium is positioned along an optical path between the wavelength converters. Further embodiments include adding a Q-switch and/or an aperture, preferably between the laser media, and adding a laser pulse grating device to control concurrent propagation or nonpropagation of the laser machining beams independently to respective targets.

An advantage of these embodiments is that a single laser provides two laser machining beams of laser output, eliminating many of the components and electronics that would be needed for two separate lasers. In addition, the burden of generating desired harmonic wavelength power is shared by two sets of harmonic converters, so there is less risk that the harmonic converters and other optical components will sustain damage. The laser components may, therefore, last longer and reduce costs and/or the total harmonic power of the laser machining beams can be higher than that achievable with a traditional single output beam.

Another advantage of these embodiments is that two laser machining beams generated by a single laser can have virtually identical characteristics, especially when the laser is symmetrically configured. Wave plates can also be used to compensate for most differences between the power levels in the two laser machining beams.

Still another advantage of these embodiments is that two laser machining beams generated by a single laser can be manipulated to have different parameters, such as wavelength or energy per pulse. For example, one laser machining beam can be employed at the fundamental laser wavelength, while the second laser machining beam can be employed at the second, third, or fourth harmonic of the first beam. A laser system providing such laser machining beams could process different materials on one or more targets sequentially or simultaneously.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
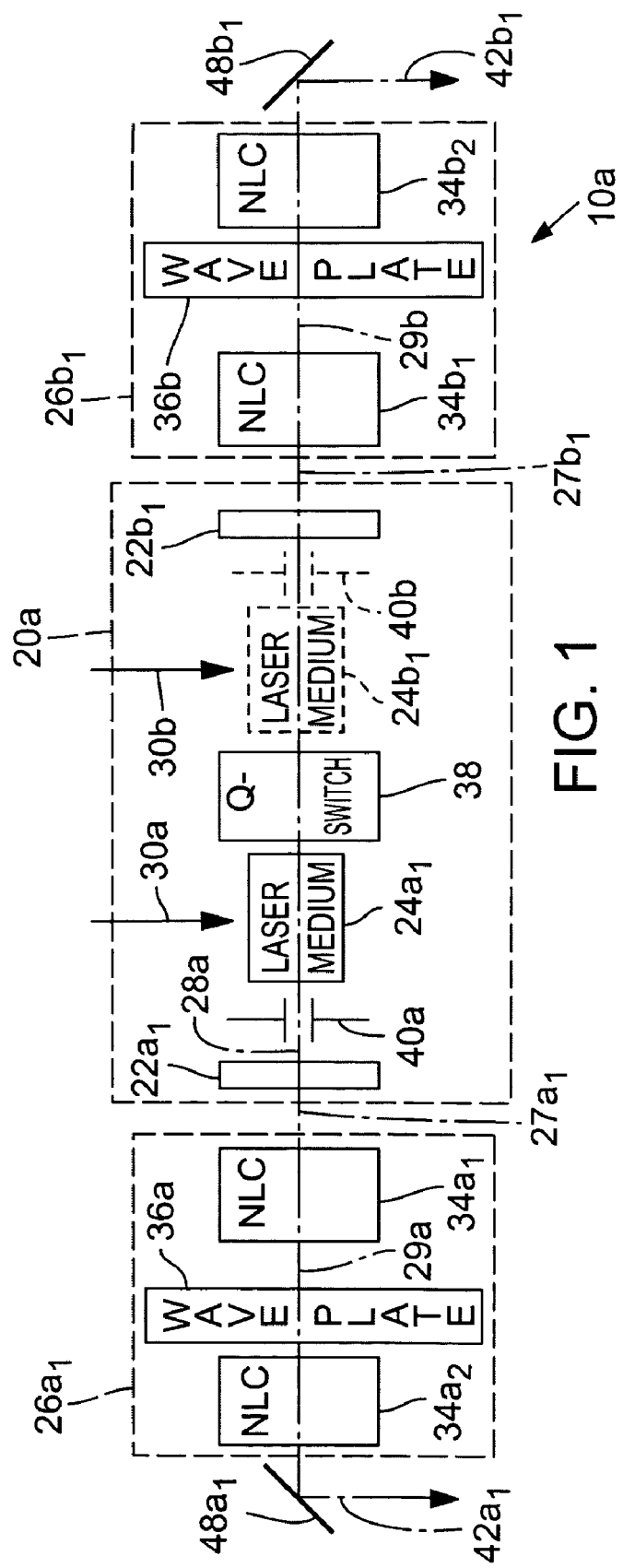
FIG. 1 is a schematic diagram of a preferred embodiment of a solid-state harmonic laser for providing two laser machining beams, employing an output port at each end of the laser resonator and employing extracavity wavelength converters.

FIG. 1 is a schematic diagram of an embodiment of a laser $10a$ including a laser resonator $20a$ having two output ports $22a$, and $22b$, (generically, output ports 22) that are output-coupling resonator mirrors and are partly reflective to a fundamental infrared (IR) wavelength generated by one or more solid-state laser media $24a_1$ and $24b_1$ (generically, laser media 24 or laser medium 24) that are along an optical path $28a$ within the laser resonator $20a$.

The laser media 24 preferably comprise a conventional solid-state lasant such as Nd:YAG, Nd:YLF, Nd:YVO$_4$, or Yb:YAG. In most embodiments, laser media $24a$ and $24b$ will comprise the same lasant, but skilled persons will appreciate that laser medium $24a$ could be different from laser medium $24b$ in composition, size, or dopant concentration, for example. Laser medium $24b$ is shown in phantom lines because it can be omitted. In some embodiments, the laser media 24 are directly or indirectly pumped from the side by one or more diodes or diode arrays (not shown) that generate laser pumping light $30a$ and $30b$ (generically, pumping light 30), but skilled persons will appreciate that one or more intracavity fold mirrors or pumping input coupling mirrors 32 (FIG. 4) and/or other well-known optical components (not shown) could be added to facilitate end-pumping. Skilled persons will appreciate that one or more lamps, lasers, or other pumping means could be employed to provide pumping light 30.

The laser resonator $20a$ also preferably, but not necessarily, includes a Q-switch 38. If two laser media 24 are employed, the Q-switch 38 is preferably, but not necessarily, positioned between them along the optical path $28a$. One or more apertures $40a$ and $40b$ (generically, apertures 40) may also be included in the laser resonator $20a$ along the optical path $28a$. It is preferable to include one aperture 40 for each laser medium 24, and it is preferable to position apertures 40 between respective laser media 24 and output ports 22.

If desirable, wavelength converters $26a_1$ and $26b_1$ (generically, wavelength converters 26) can be positioned along the optical path $28a$ outside of the laser resonator $20a$ to convert the laser machining resonator outputs $27a_1$ and $27b_1$ (generically, resonator outputs 27) to harmonic laser machining beams $42a_1$ and $42b_1$ (generically, laser machining beams 42). In embodiments wherein the wavelength converters 26 are all outside of the laser resonator $20a$, the output ports $22a_1$ and $22b_1$ are preferably about 5%–20% transmissive to the fundamental wavelength. If only one of the two wavelength converters $26a_1$ and $26b_1$ is employed, then one of the laser machining beams 42 will express the fundamental wavelength while the other laser machining beam 42 will express a harmonic wavelength.

Each wavelength converter 26 preferably comprises one or more nonlinear crystals $34a$ and $34b$, such as $34a_1$, $34a_2$, $34b_1$, and $34b_2$ (generically, nonlinear crystals 34) shown in FIG. 1. For convenience, the nonlinear crystals 34 are also labeled with "NLC" in the figures. In most embodiments, the nonlinear crystals $34a$ are preferably generally identical to the respective nonlinear crystals $34b$. With respect to the embodiment shown in FIG. 1, the nonlinear crystals $34a_1$ and $34b_1$ preferably convert the resonator outputs 27 to second harmonic laser machining outputs $29a$ and $29b$ (generically, second harmonic wavelength outputs 29), and the nonlinear crystals $34a_2$ and $34b_2$ preferably convert second harmonic wavelength outputs 29 to the laser machining beams 42, which in this embodiment preferably comprise the third harmonic wavelength. Skilled persons will appreciate, however, that the laser machining beams 42 could be adapted to comprise the fourth harmonic wavelength. Typical fundamental laser wavelengths include, but are not limited to, 1,064 nm, which has harmonic wavelengths at 532 nm (frequency doubled), 355 nm (frequency tripled), 266 nm (frequency quadrupled), and 213 nm (frequency quintupled). Skilled persons will appreciate that different combinations of wavelength converters 26 on opposite sides of laser media 24 could be employed to produce different harmonics of laser machining beam 42 on different sides of laser media 24. Skilled persons will appreciate that the wavelength converters 26 can be omitted from one or both sides of laser media 24 so that the one or both of the laser machining beams 42 may comprise the fundamental wavelength.

If the harmonic laser machining beams $42a$ and $42b$ are desired to have substantially identical parameters, such as energy per pulse, skilled persons will appreciate that the components inside and outside of the laser resonator $20a$ should be arranged substantially symmetrically. In addition, one or more wave plates $36a$ and/or $36b$ (generically, wave plates 36) with or without polarizers are preferably added between the nonlinear crystals 34 of one or both sets of wavelength converters 26 to fine-tune the respective harmonic laser machining beams $42a$ and $42b$ to have one or more substantially identical parameters such as energy per pulse. Skilled persons will appreciate that although it is preferable to position the wave plate 36 between the nonlinear crystals 34 of each wavelength converter 26, the wave plate 36 could be positioned between the output port 22 and the wavelength converter 26. Other well-known energy control devices including, but not limited to, a polarizer, an electro-optic device, an acousto-optic modulator or attenuator, a polarizer and a wave plate, or a polarizer and an electro-optic device, can additionally or alternatively be employed to control the energy of one or both laser machining beams 42.

Skilled persons will appreciate that laser machining beams 42 are significantly different from low-energy reference beams, calibration beams, and dumped beams, some of which are often the result of inconsequential resonator leakage. Skilled persons will also appreciate that the resonator components could be arranged in a variety of other combinations. For example, the Q-switch 38 and the aperture 40 could be positioned on the same side of the laser medium 24. Skilled persons will also appreciate that the cavity components can be configured to be substantially symmetrical in order to facilitate substantially similar harmonic laser machining beams $42a$ and $42b$, or the cavity components can be configured to be intentionally asymmetrical in order to provide purposefully different harmonic laser machining beams $42a$ and $42b$.

If the harmonic laser machining beams $42a$ and $42b$ are desired to have intentionally different parameters, such as wavelength, spot size, or energy per pulse, skilled persons can employ a wavelength converter $26a$ that is different from the wavelength converter $26b$. For example, the nonlinear crystals $34a$ can have different dimensions, properties, or distinct number of crystals than the nonlinear crystals $34b$, or they may be spaced or configured differently inside or outside of the laser resonator $20a$. Similarly, other resonator components may be spaced differently on each side of the laser medium 24 so as to accommodate different beam powers and divergence angles. The wave plates 36 or other power control devices can also be controlled to alter the parameters of either or both of the harmonic laser machining beams $42a$ and $42b$, and the wave plate $36a$ may also have different dimensions or properties than the wave plate $36b$ in order to facilitate different respective harmonic laser machining beams $42a$ and $42b$ to suit different particular applications.

With reference again to FIG. 1, the embodiment shown employs reflective mirrors $48a_1$ and $48b_1$ (generically, mirrors 48) to direct the respective harmonic laser machining beams $42a_1$ and $42b_1$ to beam positioning and focusing system components (not shown). In a preferred embodiment, the mirrors 48 are highly reflective to the wavelength of the harmonic laser machining beams 42, such as the third harmonic, and are highly transmissive to the fundamental and other harmonic wavelengths, such as the second harmonic at a 45-degree angle.

Figure 2:
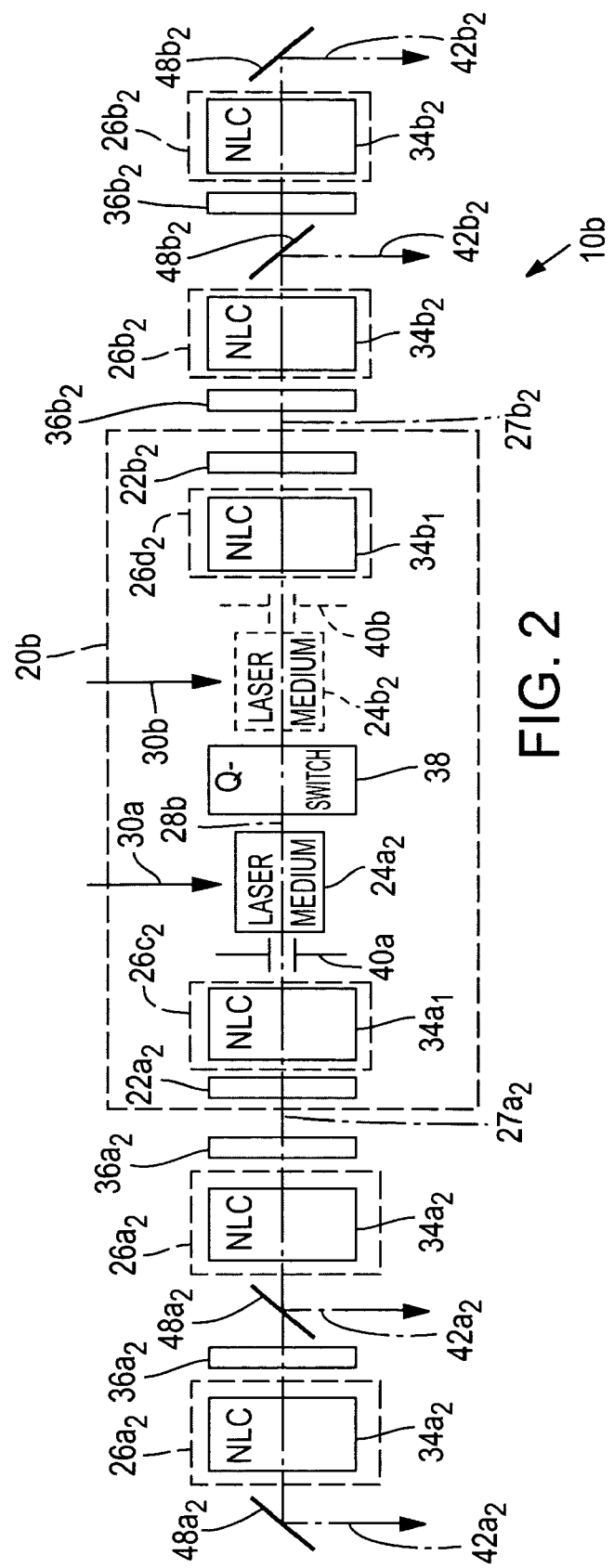
FIG. 2 is a schematic diagram of a preferred embodiment of a solid-state harmonic laser for providing two laser machining beams, employing an output port at each end of the laser resonator and employing both intracavity and extracavity wavelength converters.

FIG. 2 shows a preferred embodiment of a solid-state laser $10b$ having both extracavity wavelength converters $26a_2$ and $26b_2$ and intracavity wavelength converters $26c_2$ and $26d_2$ and employing many of the same components of the solid-state laser $10a$ in FIG. 1. For convenience, analogous components of the solid-state lasers $10a$ and $10b$ (generically, lasers 10) are generally labeled with analogous reference numerals in FIGS. 1-8, although the lettering or subscripts may differ.

With reference to FIG. 2, a laser resonator $20b$ includes intracavity wavelength converters $26c_2$ and $26d_2$ that respectively preferably comprise one or more nonlinear crystals $34a_1$ and $34b_1$. Because the laser resonator $20b$ includes intracavity wavelength converters $26C_2$ and $26d_2$, output ports $22a_2$ and $22b_2$ are preferably highly reflective to the fundamental wavelength generated by the laser medium 24 and are highly transmissive to a desired harmonic wavelength of the resonator outputs $27a_2$ and $27b_2$. Skilled persons will appreciate that other techniques of separating the harmonic wavelength from the fundamental wavelength can be employed to propagate the harmonic wavelength out of the resonator $20a$, with or without propagating through output couplers. An exemplary alternative employs prisms or nonlinear crystals 34 having Brewster angle-cuts, which are techniques well known to skilled practitioners and some of which are described in detail in U.S. Pat. No. 5,850,407 of Grossman et al.

In some embodiments of the solid-state laser $10b$, the resonator outputs 27 comprise the second harmonic, and the extracavity wavelength converters $26a_2$ and $26b_2$ that respectively preferably comprise one or more nonlinear crystals $34a_2$ and $34b_2$ preferably convert the resonator outputs 27 into the harmonic laser machining beams $42a_2$ and $42b_2$, which preferably comprise the fourth harmonic wavelength. Accordingly, partly reflective mirrors $48a_2$ and $48b_2$ are preferably highly reflective to the wavelength of the harmonic laser machining beams 42, such as the fourth harmonic, and are highly transmissive to the second harmonic wavelengths at a 45-degree angle. Respective second sets of wave plates $36a_2$ and $36b_2$, nonlinear crystals $34a_2$ and $34b_2$, and partly reflective mirrors $48a_2$ and $48b_2$ can be added to take advantage of the portions of the resonator (second harmonic) outputs 27 that propagate through the first set of partly reflective mirrors 48, so that four beams of virtually identical or substantially different harmonic laser machining output can be provided.

Figure 3:
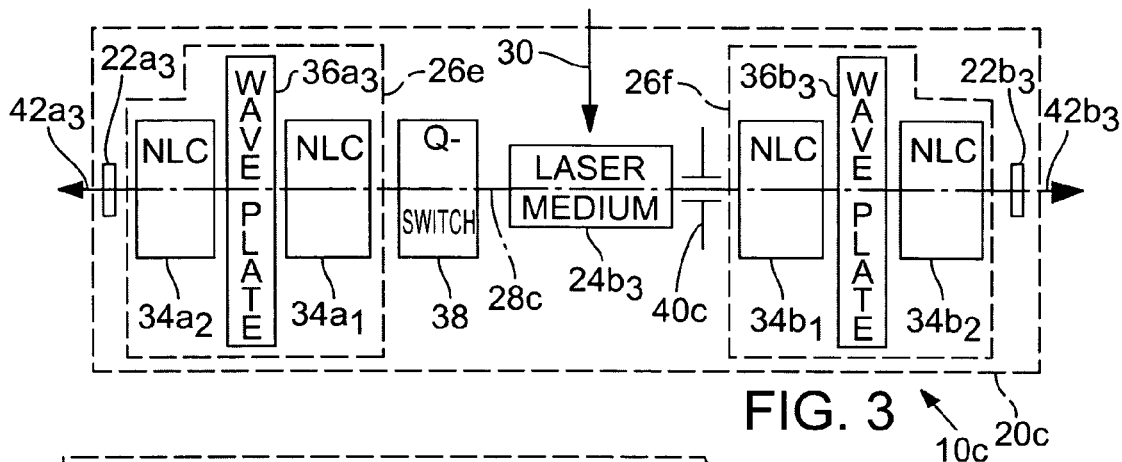
FIG. 3 is a schematic diagram of a preferred embodiment of a solid-state harmonic laser for providing two laser machining beams, employing an intracavity wavelength converter and an output port at each end of the laser resonator.

FIG. 3 is a schematic diagram of a preferred embodiment of a laser $10c$ including a laser resonator $20c$ having two output ports $22a_3$ and $22b_3$ (generically, output ports $22_3$) that are highly reflective to a fundamental wavelength generated by the laser medium $24b_3$ and are highly transmissive to a desired harmonic wavelength.

In some embodiments, the wavelength converters $26e$ and $26f$ are preferably positioned within the laser resonator $20c$ toward the respective output ports $22a_3$ and $22b_3$, and each wavelength converter 26 preferably comprises two or more nonlinear crystals $34a_1$ and $34a_2$ and $34b_1$ and $34b_2$. In preferred embodiments, wave plates $36a_3$ and $36b_3$, with or without depolarizers, are added between the nonlinear crystals 34 of both wavelength converters 26. A Q-switch 38 and/or an aperture 40 may also be added, preferably between the wavelength converters 26 and on opposite sides of the laser medium $24b_3$.

Skilled persons will also appreciate that the resonator components could be arranged in a variety of combinations to provide substantially similar or different harmonic laser machining beams $42a_3$ and $42b_3$. For example, the Q-switch 38 and the aperture 40 can be positioned on the same side of the laser medium $24b_3$, or the wave plates $36_3$ can be omitted or be positioned on either side of both nonlinear crystals 34 of a given wavelength converter 26.

As with other embodiments, if harmonic laser machining beams $42a_3$ and $42b_3$ are desired to have the same parameters, then the symmetrical components are preferably identical; and if the harmonic laser machining beams $42a_3$ and $42b_3$ are desired to have intentionally different parameters, such as different wavelengths, then the symmetrical components, such as the wavelength converters 26, may have different characteristics to provide desired differences in harmonic laser machining beams 42.

Figure 4:
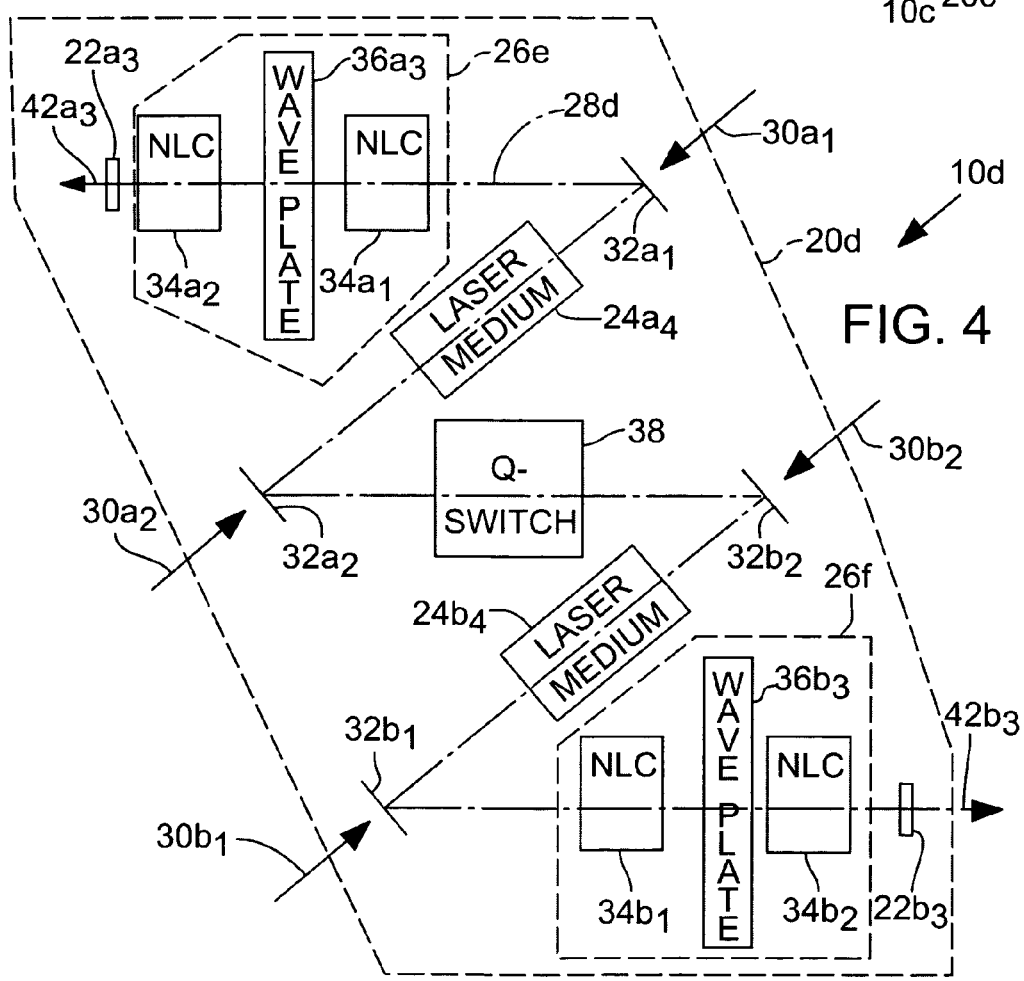
FIG. 4 is a schematic diagram of an alternative preferred embodiment of a solid-state harmonic laser for providing two laser machining beams, employing two laser media and multiple fold mirrors between the output ports.

FIG. 4 is a schematic diagram of a preferred embodiment of an alternative laser 10d that also includes two sets of intracavity wavelength converters 26e and 26f, wave plates $36a_3$ and $36b_3$, and output ports $22a_3$ and $22b_3$. However, the laser resonator 20d also includes fold mirrors $32a_1$, $32a_2$, $32b_1$, and $32b_2$ (generically, fold mirrors 32, or 32a, or 32b) and two distinct laser media $24a_4$ and $24b_4$ separated by the Q-switch 38. The fold mirrors 32 may be highly reflective to a fundamental wavelength generated by the laser media 24 and highly transmissive to a wavelength of the laser pumping light $30a_1$, $30a_2$, $30b_1$, and $30b_2$ (generically, laser pumping light 30, or 30a, or 30b).

When substantially identical parameters are desired for the harmonic laser machining beams $42a_3$ and $42b_3$ (generically laser machining beams 42), skilled persons will appreciate that the laser media 24 are preferably substantially identical in size, composition, and orientation to the optical path 28d, and the fold mirrors 32a and 32b are preferably substantially identical in size, shape, and angle of orientation to the optical path 28d. The distances between these resonator components on either side of the laser media 24 are also preferably symmetrical. However, as with other embodiments in which intentionally different parameters are desired for the harmonic laser machining beams 42, skilled persons will appreciate that resonator components and/or wavelength converters 26 on each side of the Q-switch 38 may have different properties, different sequential or axial arrangement along the optical path 28d, and/or different distances between them. Furthermore, the wave plates 36 or other energy control devices can be controlled so that the pulse energy of pulses of the first laser machining beam 42a is different from the pulse energy of pulses of the second laser machining beam 42b.

With respect to the lasers 10a–10d (generically, lasers 10), the harmonic laser machining beams 42 can be manipulated in a variety of well-known beam-combining, beam-splitting, or beam-multiplexing techniques to perform well-known laser operations such as micromachining applications including, but not limited to, via drilling; semiconductor wafer slicing, dicing, or rounding; or other laser etching or scribing techniques.

Figure 5:
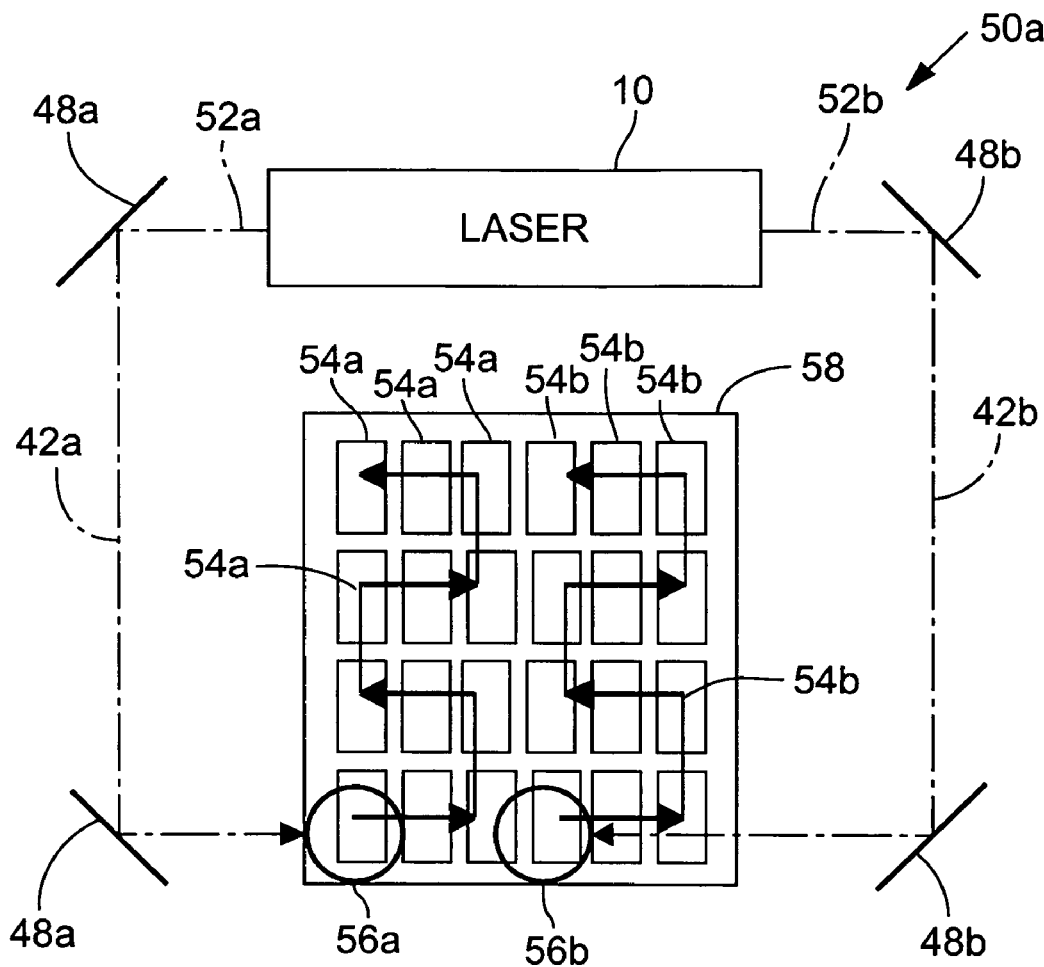
FIG. 5 is a schematic diagram showing that two laser machining beams can be employed to machine separate targets.

FIG. 5 demonstrates embodiments of a laser system 50a wherein the laser machining beams 42a and 42b from a solid-state laser 10 are directed by mirrors 48a and 48b along respective separate beam paths 52a and 52b and are directed by scan heads 56a and 56b at separate target locations on workpieces 54a and 54b supported by the same or different platforms 58.

Scan heads 56a and 56b are preferably part of a conventional beam positioning system (FIG. 7), such as those described in detail, along with improvements, in U.S. Pat. No. 5,751,585 of Cutler et al., U.S. Pat. No. 6,430,465 of Cutler, or U.S. Pat. No. 4,532,402 of Overbeck, which are assigned to the assignee of this application and which are herein incorporated by reference. Other fixed-head or fast positioner-head systems, such as galvanometer-, piezoelectrically-, or voice-coil-controlled mirrors, or linear motor-driven conventional positioning systems or those employed in the 5300 model series manufactured by Electro Scientific Industries, Inc. (ESI) of Portland, Oreg., could additionally or alternatively be employed.

In preferred applications, the workpieces 54a and 54b are substantially identical patterns, such as cell phone boards, and are preferably formed in similar alignments on a single printed circuit board (PCB) that is supported by the platform 58, such as an X-Y table. Each workpiece 54a and 54b may require substantially identical processing operations at the same or different locations. For example, the workpieces 54a and 54b may require several vias to be drilled at identical locations.

A laser 10, which provides two laser machining beams 42a and 42b for performing substantially identical processing operations on substantially identical workpieces 54a and 54b, offers several advantages over conventional laser systems that employ two distinct lasers or conventional systems that split a single beam from a single output laser. Many of the components and electronics that would be needed for two separate lasers are eliminated, so complexity and cost are reduced. The laser 10 also takes up less physical space and is more power-efficient than two separate lasers.

Another advantage is that the burden of generating desired harmonic wavelengths is shared by two sets of wavelength converters 26 so there is less risk that the wavelength converters 26 and other optical components will sustain damage. For practical reasons, the harmonic power available from a conventional solid-state harmonic laser is limited mainly by the damage risk to the wavelength converters 26. By employing two sets of wavelength converters 26, skilled persons can employ a more powerful fundamental lasing engine and thereby derive more harmonic output power from a single resonator. Thus, each of the beams generated from the laser 10 may have the same practical maximum output power as that of a single beam generated by a conventional laser, or, for example, the sum of the output powers from the first and second beams can be greater than the practical maximum output power of the traditional single-output beam.

With respect again to performing substantially identical processing operations on substantially identical workpieces 54a and 54b, the two laser machining beams 42a and 42b generated by the laser 10 are more likely to have identical pulse characteristics, especially when the resonator components are identical and are symmetrically positioned. Employing a laser 10 to provide the two laser machining beams 42a and 42b minimizes variations in age-related deterioration that would occur between different resonators, so the laser machining beams 42a and 42b are affected by substantially the same amount of cavity loss and/or performance drifting of the optical components or aging of the single or respective pumping source(s). Skilled persons will appreciate that resonator loss differences or aging of the pumping sources in traditional separate resonators due to variable deterioration cause significant differences in certain characteristics of the laser beams, such as energy per pulse and beam quality, and the variable resonator loss differences require constant recalibration of the two traditional resonators to each other.

Differences in beam characteristics from different resonators could result in one laser beam performing within acceptable tolerance while the other laser beam performs defective operations. For example, some vias may be drilled to a desirable depth or quality while other vias may be drilled in a manner that unacceptably damages the via bottom layer or surrounding layers. The acceptable range of laser pulse energies is often referred to as a "process window." For many laser processing applications, the process window requires that laser pulse energy vary by less than 5% from a selected pulse energy value.

The laser machining beams 42a and 42b are, therefore, more likely to be performing substantially identical processing operations with substantially identical output parameters (varying by less than 5% of pulse energy, for example), especially at high repetition rates such as greater than 5 or 10 kHz at harmonic wavelengths, on substantially identical via patterns on the workpieces 54a and 54b, so that both of the laser machining beams 42a and 42b produce high-quality results, for example, making high-quality vias in PCBs.

Figure 6:
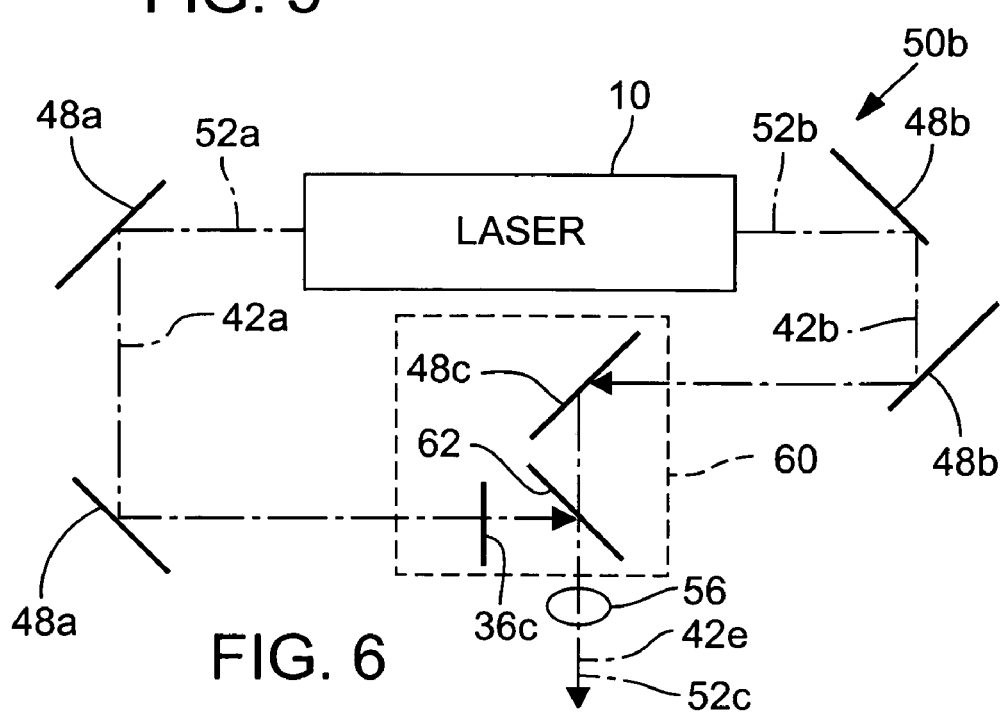
FIG. 6 is a schematic diagram showing that two laser machining beams can be combined to machine the same target.

FIG. 6 demonstrates embodiments of a laser system 50b wherein the laser machining beams 42a and 42b from the laser 10 are combined through a beam combiner 60 to provide a single laser system output 42e from the scan head 56 along the beam path 52c. The beam combiner 60 may include a fold mirror 48c, a beam-combining mirror 62, and an additional wave plate 36c. If the beam paths 52a and 52b are substantially equal before they reach the beam combiner 60, the laser system output 42e has the combined energy per pulse of the laser machining beams 42a and 42b without affecting the shape of the laser pulse. Skilled persons will appreciate that the combined energy of the laser machining beams 42a and 42b may be as much as about twice the energy per pulse as that available from a conventional solid-state laser. Skilled persons will particularly appreciate these advantages when harmonic wavelengths are desired.

Alternatively, an optional optical delay path (not shown) can be employed along one of the beam paths 52a or 52b upstream of the beam combiner 60 to temporally separate the laser machining beams 42a and 42b in order to effectively elongate the pulse width experienced by a target or to provide immediately sequential pulses along the same beam path 52c. The delay between the laser machining beams 42a and 42b would preferably be from zero to about one pulse width, and the preferred combined adjustable pulse width would be from one to about two pulse widths of a given laser machining beam 42. Alternatively, the delay could be used to effectively double the repetition rate over the capabilities of a conventional single-output resonator. Skilled persons will appreciate that a small delay between the laser machining beams 42a and 42b can also be accomplished by moving the beam combiner 60 to be at respectively smaller and larger distances from the final fold mirrors 48a and 48b in order to provide a slightly adjustable combined pulse width.

Skilled persons will appreciate that the laser machining beams 42a and 42b can be delivered sequentially or substantially simultaneously with a predetermined angular or lateral offset, such that the resulting laser spots are substantially adjacent to or substantially overlap one another. Skilled persons will also appreciate that these laser machining beams 42a and 42b can have the same parameters or have different wavelengths, pulse energies, or other beam characteristics.

Figure 7:
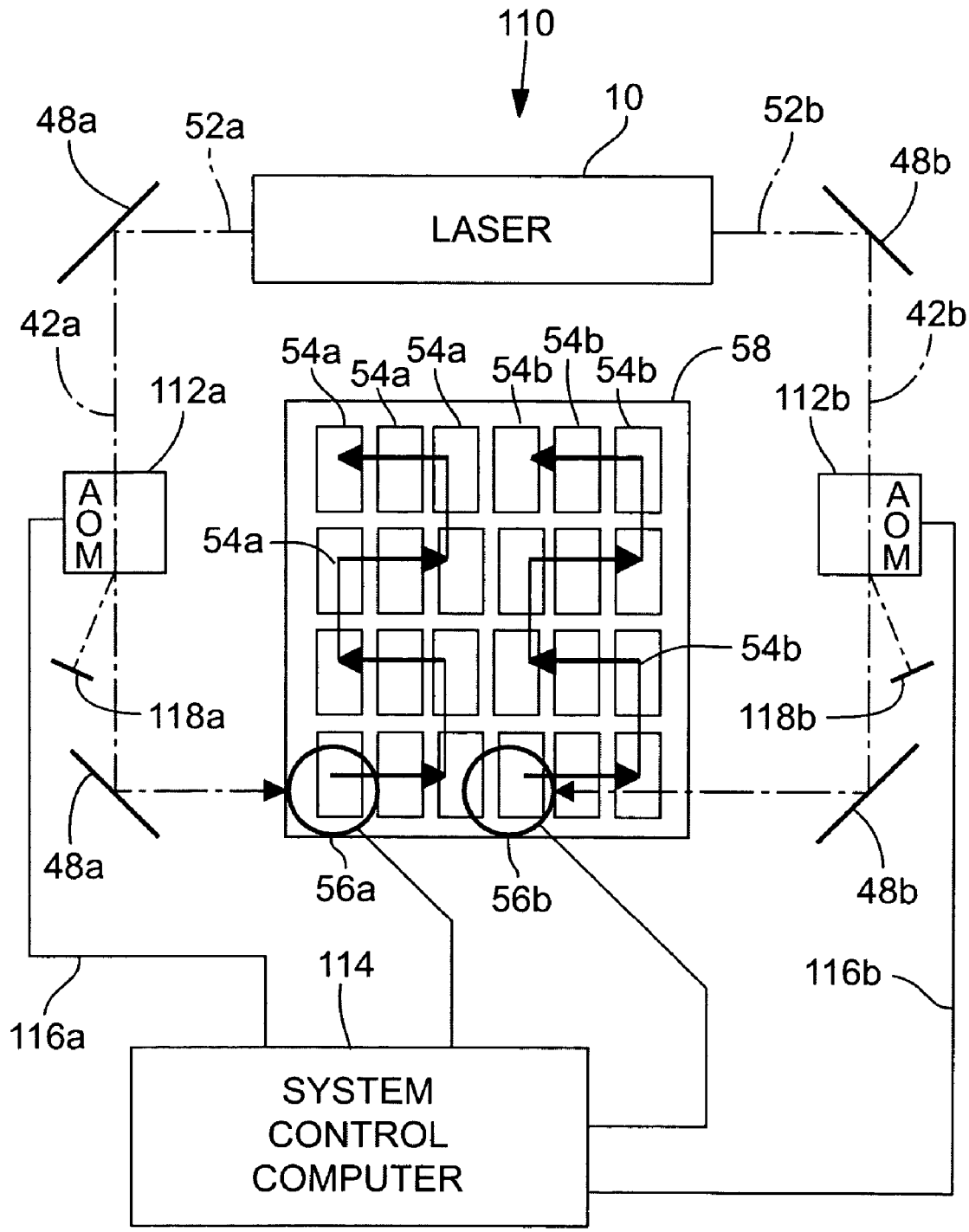
FIG. 7 is a schematic block diagram showing an embodiment of an exemplary laser system employing two laser pulse gating devices to provide on-demand, time-independent targeting for respective laser machining beams from the same resonator.

FIG. 7 shows, as an example, a via-drilling system 110 that employs laser pulse gating devices 112a and 112b, positioned along beam paths 52a and 52b between the laser 10 and the respective scan heads 56a and 56b. In some preferred embodiments, such as those in which the laser pulses of the laser machining beams 42a and 42b are generated by the Q-switch 38 substantially continuously at a substantially constant repetition rate, a system controller or system computer 114 controls the scan head 56a to be aligned to a target location and then the directly or indirectly sends a "gating ON" gating control signal 116a to the laser gating device 112a, thereby prompting laser gating device 112a to assume an output transmitting state. The output transmitting state permits laser pulses of the laser machining beam 42a to propagate through the first gating device 112a and to be directed by the scan head 56a in order to reach the target location and perform the desired laser processing operation.

After a desired number of laser pulses of laser machining beam 42a impinge the target location, the system computer 114 directly or indirectly shuts off the gating signal 116a so that the gating device 112a assumes a nontransmitting state and the laser machining beam 42a is blocked from reaching the target location such as by being diverted to an absorber 118a. Then the system computer 114 commands the first scan head 56a to move and direct its aim at another target location before the system computer 114 sends another "gating ON" gating signal 116a to the laser pulse gating device 112a. The system computer 114 concurrently commands the second scan head 56b and second gating device 112b in the same manner, performing laser processing only when desired at the target locations swept by the second scan head 56b.

One advantage of such embodiments is that the laser 10 can remain running at a predetermined repetition rate, so there is no thermal loading variation on the wavelength converter(s) 26, and the thermally induced harmonic pulse energy drifting is thus eliminated. Another advantage of such embodiments is that the laser machining beams 42a and 42b can be gated completely independently of each other. Thus, scan heads 56a and 56b can perform completely independent laser processing tasks at different locations on different materials concurrently as well as sequentially. Another advantage of such embodiments is that the laser pulse gating devices 112a and 112b can perform laser energy control functions as well, thereby enhancing the system's performance and reducing its cost.

Exemplary laser pulse gating devices include high speed electro-optic (E-O) devices or acousto-optic (A-O) devices, such as Model N30085–05 made by NEOS Technologies, Melbourne, Fla. or modified versions of it. Further details concerning on-demand triggering of a laser pulse gating device 112 can be found in U.S. Pat. No. 6,172,325 of Baird et al. and U.S. patent application Ser. No. 10/611,798 of Sun et al., which are herein incorporated by reference.

Radio-frequency (RF) loading control techniques described in U.S. patent application Ser. No. 10/611,798 of Sun et al. can additionally be employed to provide nearly constant thermal loading on an A-O laser pulse gating device 112 by applying an RF pulse to the A-O gating device 112 in coincidence with pulses of the laser machining beam 42 when the scan head 56 is over a target location (in other words, when a working laser machining beam 42 is demanded) and by applying an RF pulse with the same RF energy to the A-O gating device 112 but in noncoincidence with the pulses of the laser machining beam 42 when the scan head 56 is over an intermediate location (in other words, when a working laser machining beam 42 is not demanded). Skilled persons will appreciate that with such substantially constant thermal loading on an A-O gating device 112, there are minimal adverse effects by an A-O gating device 112 on the quality and positioning accuracy of the working laser machining beam 42.

It will be further appreciated that the RF power of the RF pulse on an A-O gating device 112 can be adjusted to control the energy of the working laser machining beam 42 to meet target processing needs, while the RF duration of the RF pulse can be controlled accordingly to maintain a substantially constant RF energy or arithmetic product of the RF power and the RF duration of the RF pulse.

Figure 8:
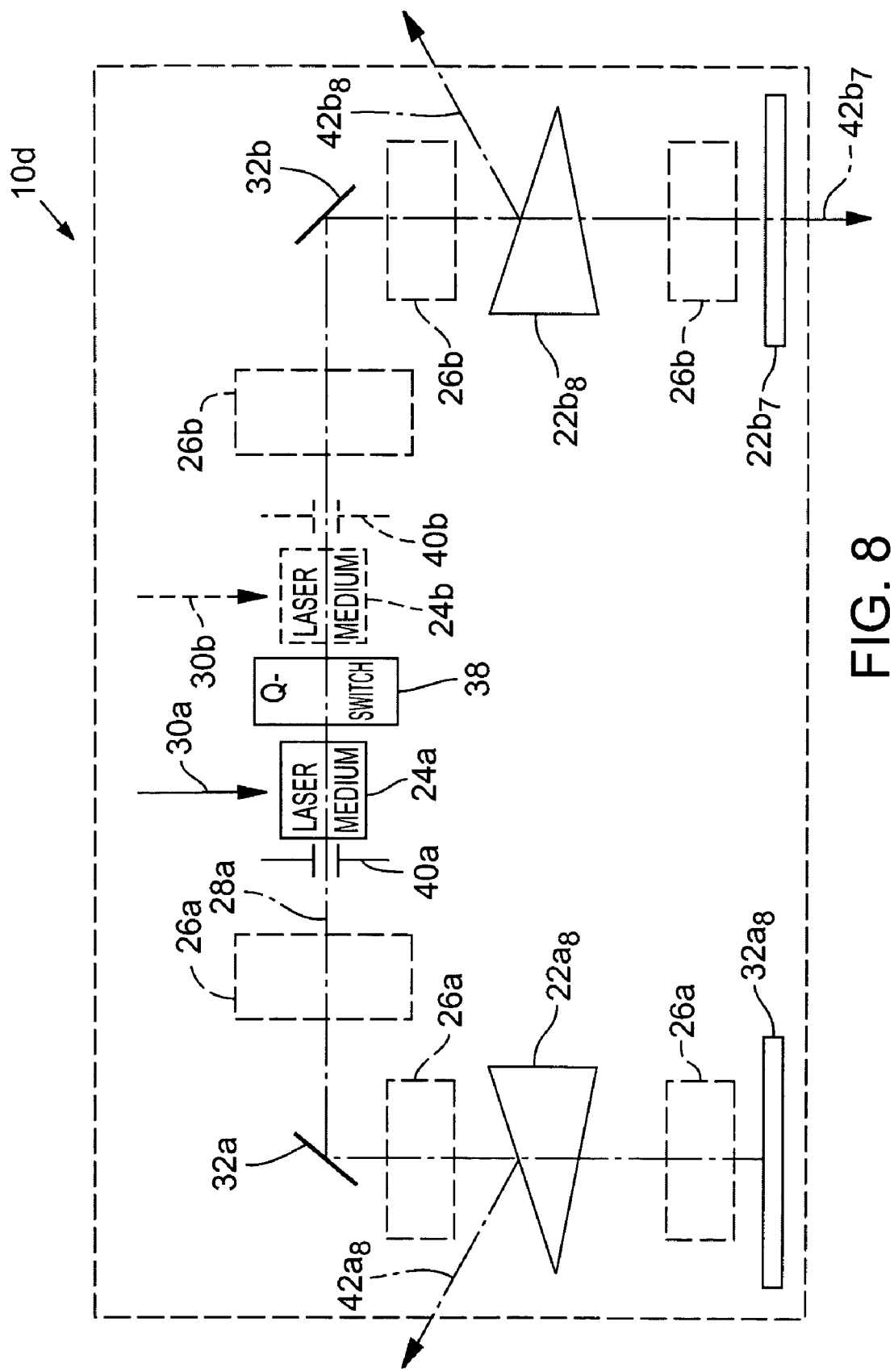
FIG. 8 is a schematic block diagram showing a generic embodiment of an exemplary laser employing at least one prism as an output port.

FIG. 8 shows an embodiment of an exemplary laser $10d$ with components similar to those of the other lasers 10, but specifically employing at least one prism $22a_8$ as at least one of its output ports 22 and employing a nontransmissive resonator mirror $32a_8$ at one end of resonator $20d$. Prism $22b_8$ is shown in phantom because it may be included to serve as an output port 22 or may be omitted, or prism $22b_8$ may be employed as an output port 22 for one selected wavelength while output port $22b_7$ may be transmissive to the same or different wavelength in order to produce laser machining beams $42b_8$ and $42b_7$. Skilled persons are again reminded that other techniques of separating the harmonic wavelength from the fundamental wavelength can be employed to propagate the harmonic wavelength out of the resonator 20 with or without propagating through output couplers, such as techniques employing Brewster angle-cut NLCs 34.

The wavelength converters 26a and 26b are shown in phantom and in alternative positions to emphasize variations described with respect to other embodiments. Their inclusion and positions may be varied. Similarly, laser medium 24b is shown in phantom.

Figure 9:
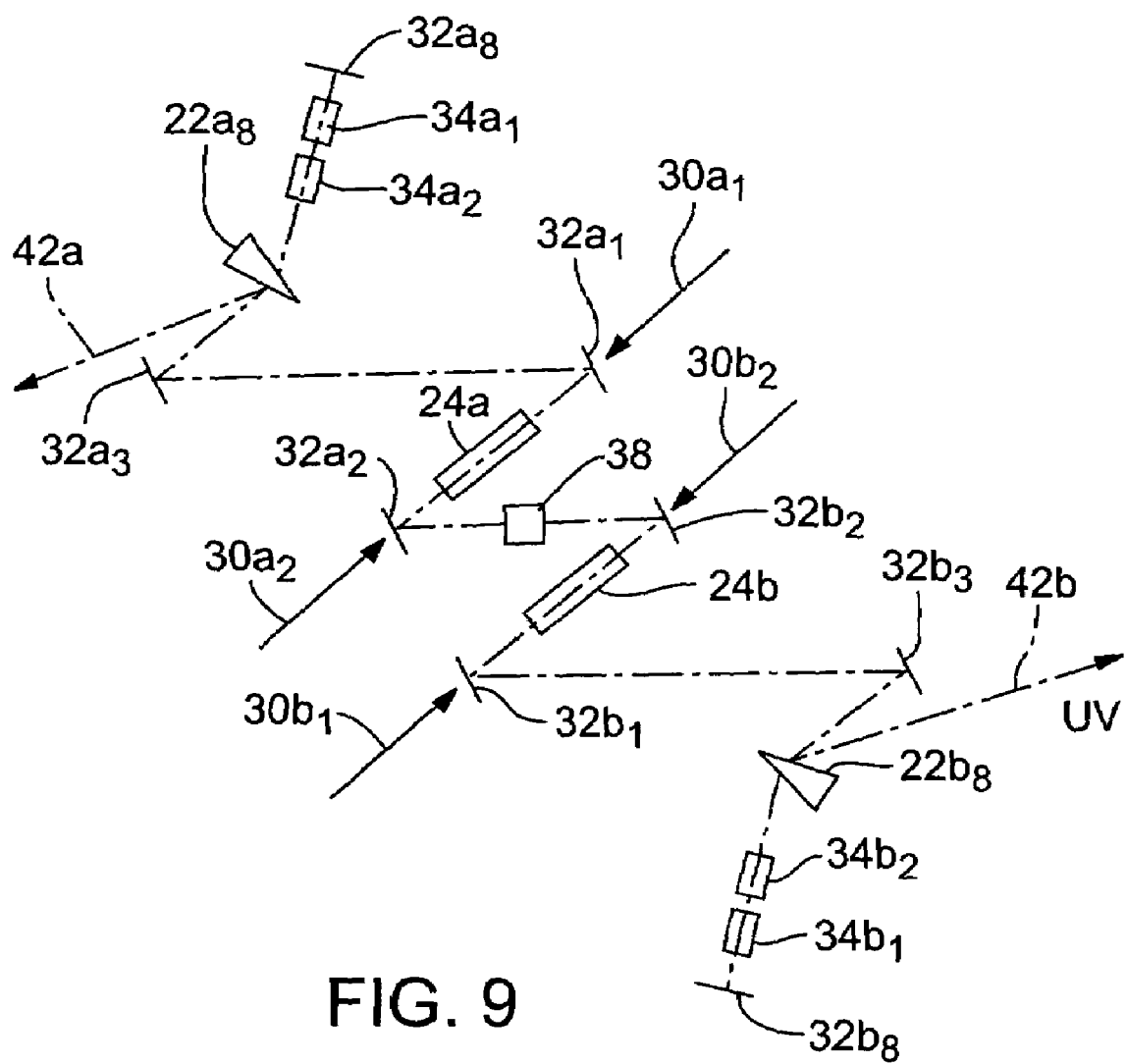
FIG. 9 is a schematic block diagram showing a specific embodiment of an exemplary laser employing two prisms as the output ports.

FIG. 9 shows a specific embodiment of an exemplary laser $10e$ employing two prisms $22a_8$ and $22b_8$ as the output ports 22. Laser $10e$ also includes end-pumped laser media 24; resonator end mirrors $32a_8$ and $32b_8$; and NLCs $34a$ and $34b$, which are positioned between the resonator end mirrors $32a_8$ and $32b_8$ and the prisms $22a_8$ and $22b_8$, respectively.

It will be obvious to those having skill in the art that many changes may be made to the details of the above-described embodiments without departing from the underlying principles of the invention. The scope of the present invention should, therefore, be determined only by the following claims.

The invention claimed is:

1. A solid-state laser comprising:
a solid-state laser medium positioned along an optical path to receive laser pumping light from a laser pumping source, the laser medium having opposing first and second surfaces and being adapted to facilitate generation of laser output having a first wavelength;
a Q-switch positioned along the optical path between first and second output ports to transform the laser output into a pulsed laser output for propagation along first and second path portions of the optical path extending from the respective first and second surfaces of the laser medium, the first path portion intersecting the first output port and the second path portion intersecting the second output port, the first and second path portions intersecting each other at neither one of the first and second output ports, and the first and second output ports being positioned along the optical path and on different sides of the laser medium for propagating respective first and second laser machining beams of pulsed laser output; and
first and second wavelength converters positioned along the optical path and respectively on different sides of the laser medium, the first and second wavelength converters being adapted for converting the wavelength of the pulsed laser output to a harmonic of the first wavelength such that the first and second laser machining beams have a harmonic wavelength.

2. The laser of claim 1 in which the first and second wavelength converters are positioned between the first and second output ports.

3. The laser of claim 2 in which at least one of the first and second output ports comprises a resonator mirror that is highly reflective to the first wavelength and is significantly transmissive to the harmonic wavelength.

4. The laser of claim 1 in which the first wavelength converter comprises first and second nonlinear crystals positioned on different sides of the first output port such that the first nonlinear crystal converts the first wavelength to the harmonic wavelength and the second nonlinear crystal converts the harmonic wavelength to another harmonic wavelength.

5. The laser of claim 1 in which at least the first output port comprises a resonator mirror that is highly reflective to the first wavelength and significantly transmissive to the harmonic wavelength and in which at least the first wavelength converter comprises first and second nonlinear crystals positioned on different sides of the first output port such that the first nonlinear crystal converts the first wavelength to the harmonic wavelength and the second nonlinear crystal converts the harmonic wavelength to another harmonic wavelength.

6. The laser of claim 1 in which at least the first output port comprises a resonator mirror that is significantly transmissive to the first wavelength and in which at least the first wavelength converter comprises at least one nonlinear crystal positioned externally to the first output port such that the first wavelength passes through the first output port and the nonlinear crystal converts the first wavelength to the harmonic wavelength.

7. The laser of claim 1 in which the first and second wavelength converters have different properties such that the first and second laser machining beams have different harmonic wavelengths.

8. The laser of claim 1 in which the first output port comprises a first resonator mirror that is at least partly transmissive to the harmonic wavelength, a first prism that deflects the optical path, or an angle cut on the first wavelength converter that deflects the optical path, and in which the second output port comprises a second resonator mirror that is at least partly transmissive to the harmonic wavelength, a second prism that deflects the optical path, or an angle cut on the second wavelength converter that deflects the optical path.

9. The laser of claim 1 in which the first output port comprises a first prism that deflects the optical path or an angle cut on the first wavelength converter that deflects the optical path, and in which the second output port comprises a second prism that deflects the optical path or an angle cut on the second wavelength converter that deflects the optical path, the laser further comprising:
first and second resonator mirrors that are highly reflective to the first wavelength and define ends of a resonator such that the first and second output ports are positioned between the laser medium and the respective resonator mirrors and such that the first and second output ports deflect the harmonic wavelength out of the resonator without passing through the resonator mirrors to provide the first and second machining beams.

10. The laser of claim 1, further comprising:
first and second energy control devices positioned along the optical path on opposite sides of the laser medium.

11. The laser of claim 10 in which the first and second energy control devices comprise wave plates.

12. The laser of claim 10 in which the first and second energy control devices are controllable to make respective laser pulse energies of the first and second laser machining beams substantially the same.

13. The laser of claim 10 in which the first and second energy control devices are controllable to make laser pulse energy of the first beam significantly different from laser pulse energy of the second beam.

14. The laser of claim 1 in which the respective first and second wavelength converters and output ports are substantially identical such that first characteristics of the first laser machining beam propagating through the first output port are substantially identical to second characteristics of the second laser machining beam propagating through the second output port, wherein the first and second beam characteristics comprise one or more of beam propagation quality, laser pulse width, or laser pulse energy.

15. The laser of claim 14 in which the pulsed laser output has a repetition rate of greater than 1 Hz.

16. The laser of claim 15 in which the pulsed laser output has a repetition rate of greater than 5 kHz.

17. The laser of claim 1, further comprising: a second solid-state laser medium positioned along the optical path between the first and second output ports, wherein the Q-switch is positioned between the laser media.

18. The laser of claim 17 in which the laser medium comprises Nd:YAG, Nd:YLF, Nd:YVO$_4$, or Yb:YAG and in which the second laser medium comprises Nd:YAG, Nd:YLF, Nd:YVO$_4$, or Yb:YAG.

19. The laser of claim 1 in which the laser medium comprises Nd:YAG, Nd:YLF, Nd:YVO$_4$, or Yb:YAG.

20. The laser of claim 1 in which the first laser machining beam comprises at least one of the second, third, fourth, or fifth harmonics of the first wavelength and the second laser machining beam comprises at least one of the second, third, fourth, or fifth harmonics of the first wavelength.

21. The laser of claim 1 in which an input coupling mirror is employed to facilitate end-pumping the laser medium.

22. The laser of claim 1 in which the laser pumping source comprises at least one of a laser diode, a diode array, or another laser.

23. The laser of claim 1 in which the laser pumping source comprises one or more lamps.

24. The laser of claim 1 in which the first and second laser machining beams comprise the same harmonic wavelength, the laser output at the harmonic wavelength has a practical maximum output power for a traditional single-output harmonic beam largely determined by a damage risk to the wavelength converters, and the laser is capable of providing, without damage to the first and second wavelength converters, a total output power of the first and second laser machining beams that is significantly greater than the practical maximum output power of the traditional single-output harmonic beam.

25. The laser of claim 1 in which the first laser machining beam propagating through the first output port and the second laser machining beam propagating through the second output port have output characteristics that are substantially equally affected by age-related deterioration of components in the laser.

26. The laser of claim 1 in which the first and second laser machining beams are directed at spaced-apart respective first and second substantially identical targets to perform substantially identical operations substantially simultaneously.

27. A laser system comprising:
a solid-state laser medium positioned along an optical path to receive laser pumping light from a laser pumping source, the laser medium having opposing first and second surfaces and being adapted to facilitate generation of laser output having a first wavelength;
a Q-switch positioned along the optical path between first and second output ports to transform the laser output into pulsed laser output for propagation along first and second path portions of the optical path extending from the respective first and second surfaces of the laser medium, the first path portion intersecting the first output port and the second path portion intersecting the second output port, the first and second path portions intersecting each other at neither one of the first and second output ports, and the first and second output ports being positioned along the optical path and on different sides of the laser medium for propagating respective first and second laser machining beams of the pulsed laser output;
a first wavelength converter positioned along the optical path and adapted for converting the wavelength of the first laser machining beam to a harmonic of the first wavelength such that the first laser machining beam has a harmonic wavelength;
first and second energy control devices, positioned along the optical path on different sides of the laser medium, for controlling respective first and second energies of the respective first and second laser machining beams; and
a beam positioning system adapted for directing the first and second laser machining beams along respective first and second beam paths to respective first and second target locations to perform one or more micromachining operations.

28. The laser system of claim 27, further comprising:
a second wavelength converter positioned along the optical path on a different side of the laser medium from that of the first wavelength converter, the second wavelength converter adapted for converting the wavelength of the second laser machining beam to a harmonic of the first wavelength such that the second laser machining beam has a harmonic wavelength.

29. The laser system of claim 28 in which the respective first and second wavelength converters and output ports are substantially identical so that first characteristics of the first laser machining beam propagating through the first output port are substantially identical to second characteristics of the second laser machining beam propagating through the second output port, wherein the first and second beam characteristics comprise one or more of beam propagation quality, laser pulse width, and laser pulse energy.

30. The laser system of claim 29 in which the pulsed laser output has a repetition rate of greater than 5 kHz.

31. The laser system of claim 27 in which the pulsed laser output has a repetition rate of greater than 1 Hz.

32. The laser system of claim 27 in which the first laser machining beam comprises at least one of the second, third, fourth, or fifth harmonics of the first wavelength and the second laser machining beam comprises at least one of the first, second, third, fourth, or fifth harmonics of the first wavelength.

33. The laser system of claim 28 in which the first and second wavelength converters have different properties such that the first and second beams have different harmonic wavelengths.

34. The laser system of claim 28 in which the first and second wavelength converters are respectively positioned between the laser medium and the respective first and second output ports.

35. The laser system of claim 27 in which the first and second laser machining beams comprise at least one substantially different laser processing parameter, wherein the laser processing parameter comprises beam wavelength, laser pulse width, laser pulse energy, or number of laser pulses.

36. The laser system of claim 27 in which the first energy control device comprises at least one of a wave plate, a polarizer, an electro-optic device, a polarizer and a wave plate, or a polarizer and an electro-optic device, and in which the second energy control device comprises at least one of a wave plate, a polarizer, an electro-optic device, a polarizer and a wave plate, or a polarizer and an electro-optic device.

37. The laser system of claim 36 in which the first and second energy control devices control the respective first and second laser machining beams so that their energies are substantially identical.

38. The laser system of claim 36 in which the first and second energy control devices control the respective first and second laser machining beams so that their energies are significantly different.

39. The laser system of claim 38 in which the first and second laser machining beams perform different operations simultaneously at respectively different target locations.

40. The laser system of claim 27 in which the first output port comprises a first resonator mirror that is at least partly transmissive to the harmonic wavelength, a first prism that deflects the optical path, or an angle cut on the first wavelength converter that deflects the optical path.

41. The laser system of claim 27 in which the beam positioning system comprises first and second scanning heads to direct the respective first and second laser machining beams at spaced-apart respective first and second substantially identical targets to perform substantially identical operations substantially simultaneously.

42. The laser system of claim 27 in which the first and second beam paths are combined to propagate coaxially and are directed by a scanning head to jointly perform a laser processing operation.

43. The laser system of claim 42 in which the second beam path has characteristics different from those of the first beam path such that the second laser machining beam initiates impingement after the first laser machining beam initiates impingement to create an effective pulsewidth of longer duration than the duration of pulsewidths from the first or second laser machining beams.

44. The laser system of claim 27 in which the first and second beam paths are combined with a predetermined angular offset and are directed by a scanning head to jointly perform a laser processing operation.

45. The laser system of claim 27 in which the first and second beam paths are combined with a predetermined lateral offset and are directed by a scanning head to jointly perform a laser processing operation.

46. The laser system of claim 27 in which the first and second beam paths are combined to jointly perform a laser processing operation and the first and second laser machining beams have at least one intentionally substantially different beam characteristic, wherein the beam characteristic comprises beam wavelength, laser pulse width, or laser pulse energy.

47. The laser system of claim 27 in which the first and second beams cooperate to drill a via.

48. The laser system of claim 27, further comprising:
first and second laser pulse gating devices respectively positioned along the first and second beam paths for selectively gating the pulsed laser output of the respective first and second laser machining beams such that the first laser pulse gating device provides a first output transmitting state to permit transmission of pulsed laser output of the first laser machining beam through a first scanning head along the first beam path to a first target location, and such that the second laser pulse gating device provides a second output transmitting state to permit transmission of the pulsed laser output of the second laser machining beam through a second scanning head along the second beam path to a second target location, the first and second laser pulse gating devices providing respective first and second relatively nontransmitting states that inhibit the pulsed laser output of the respective first and second laser machining beams from propagating along the respective first and second beam paths such that the respective first and second laser pulse gating devices can simultaneously permit the pulsed laser output of one of the first or second laser machining beams to propagate to its respective target and inhibit the pulsed laser output of the other of the first or second laser machining beams from propagating along its beam path, and such that the pulsed laser output is adapted to be generated substantially continuously at a substantially constant repetition rate.

49. The laser system of claim 48 in which the first and/or second laser pulse gating devices provide output transmitting states at substantially regular intervals and in temporal proximity to laser pulses of the pulsed laser output such that respective first or second output transmitting states coincident with the laser pulses of the pulsed laser output propagate laser pulses of the respective laser machining beam and such that the output transmitting states noncoincident with the laser pulses of the pulsed laser output inhibit propagation of laser pulses of the respective laser machining beam.

50. The laser system of claim 48 in which the first and/or second laser pulse gating device comprises an acousto-optic modulator or an electro-optic device with a depolarizer.

51. The laser system of claim 48 in which the first and second laser pulse gating devices function as the respective first and second energy control devices and are adapted to control percentage of laser energy transmission of the respective first and second laser machining beams whenever the respective laser pulse gating device is in the output transmitting state.

52. The laser system of claim 48 in which the first and second laser machining beams comprise at least one substantially different laser processing parameter, wherein the laser processing parameter comprises beam wavelength, laser pulse width, laser pulse energy, or number of laser pulses.

53. A method for generating two laser machining beams, comprising:
supplying pumping light to a laser medium having opposing first and second surfaces positioned along an optical path;
employing a Q-switch to provide a pulsed laser output, the Q-switch being positioned along the optical path between first and second output ports that are respectively positioned along the optical path on opposite sides of the laser medium;
propagating the pulsed laser output along first and second path portions of the optical path extending from the respective first and second surfaces of the laser medium, the first path portion intersecting the first output port and the second path portion intersecting the second output port, and the first and second path portions intersecting each other at neither one of the first and second output ports, such that the pulsed laser output propagates along the first path portion to provide from the first output port a first laser machining beam and such that the pulsed laser output propagates along the second path portion to provide from the second output port a second laser machining beam; and directing the first laser machining beam at a first target location and directing the second laser machining beam at a second target location to perform one or more micromachining operations.

54. The method of claim 53 in which the first laser machining beam comprises at least one of a first, second, third, fourth, or fifth harmonic wavelength and the second laser machining beam comprises at least one of a first, second, third, fourth, or fifth harmonic wavelength.

55. The method of claim 53, further comprising employing first and second wavelength converters positioned along the optical path on different sides of the laser medium to convert the respective first and second laser machining beams of pulsed laser output to harmonic laser output, such that the respective first and second wavelength converters and output ports are substantially identical and such that first characteristics of the first laser machining beam propagating through the first output port are substantially identical to second characteristics of the second laser machining beam propagating through the second output port, wherein the beam characteristics comprise one or more of beam propagation quality, laser pulse width, and laser pulse energy.

56. The method of claim 55 in which the laser output has a repetition rate of greater than 5 kHz.

57. The method of claim 53, further comprising employing first and second wavelength converters positioned along the optical path on different sides of the laser medium to convert the respective first and second laser machining beams of pulsed laser output to harmonic laser output, such that the first and second wavelength converters have different properties and such that the first and second laser machining beams have different harmonic wavelengths.

58. The method of claim 53, further comprising:
employing first and second energy control devices, positioned along the optical path on different sides of the laser medium, for controlling respective first and second energies of the respective first and second laser machining beams, in which the first energy control device comprises at least one of a wave plate, a polarizer, an electro-optic device, a polarizer and a wave plate, or a polarizer and an electro-optic device, and in which the second energy control device comprises at least one of a wave plate, a polarizer, an electro-optic device, a polarizer and a wave plate, or a polarizer and an electro-optic device.

59. The method of claim 53 in which first and second laser pulse gating devices are respectively positioned along the first and second beam paths for selectively gating the pulsed laser output of the respective first and second laser machining beams, such that the first laser pulse gating device provides a first output transmitting state to permit transmission of pulsed laser output of the first laser machining beam through a first scanning head along the first beam path to a first target location and such that the second laser pulse gating device provides a second output transmitting state to permit transmission of the pulsed laser output of the second laser machining beam through a second scanning head along the second beam path to a second target location, the first and second laser pulse gating devices providing respective first and second relatively nontransmitting states that inhibit the pulsed laser output of the respective first and second laser machining beams from propagating along the respective first and second beam paths such that the respective first and second laser pulse gating devices can simultaneously permit the pulsed laser output of one of the first or second laser machining beams to propagate to its respective target and inhibit the pulsed laser output of the other of the first or second laser machining beams from propagating along its beam path, and such that the pulsed laser output is adapted to be generated substantially continuously at a substantially constant repetition rate.

60. The method of claim 59 in which the first and second laser pulse gating devices function as the respective first and second energy control devices and are adapted to control percentage of laser energy transmission of the respective first and second laser machining beams whenever the respective pulse gating device is in the output transmitting state.

61. The method of claim 53 in which the first and second laser machining beams comprise the same harmonic wavelength and the laser output at the harmonic wavelength has a practical maximum output power for a traditional single-output harmonic beam largely determined by a damage risk to the wavelength converters, and in which the laser is capable of providing, without damaging the wavelength converters, a total output power of the first and second laser machining beams that is significantly greater than the practical maximum output power of the traditional single-output harmonic beam.

62. The method of claim 53 in which first and second scanning heads direct the respective first and second laser machining beams at spaced-apart respective first and second substantially identical targets to perform substantially identical operations substantially simultaneously.

63. The method of claim 53 in which the first and second laser machining beams are combined to propagate through a common scan head to jointly perform a laser processing operation.

64. The method of claim 53 in which the first and second wavelength converters are positioned along the optical path externally to the respective first and second output ports.

* * * * *